(12) United States Patent
Thayer et al.

(10) Patent No.: US 11,148,248 B2
(45) Date of Patent: Oct. 19, 2021

(54) SMOOTHING ROUND INTERNAL PASSAGES OF ADDITIVELY MANUFACTURED PARTS USING METALLIC SPHERES

(71) Applicant: UNITED TECHNOLOGIES CORPORATION, Farmington, CT (US)

(72) Inventors: Henry H. Thayer, Wethersfield, CT (US); Wendell V. Twelves, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 218 days.

(21) Appl. No.: 15/957,873

(22) Filed: Apr. 19, 2018

(65) Prior Publication Data

US 2019/0321938 A1    Oct. 24, 2019

(51) Int. Cl.
*B24B 39/02* (2006.01)
*B33Y 40/00* (2020.01)
(Continued)

(52) U.S. Cl.
CPC ............ *B24B 39/023* (2013.01); *B33Y 40/00* (2014.12); *B33Y 80/00* (2014.12); *F01D 25/12* (2013.01); *F01D 25/18* (2013.01); *F05D 2220/32* (2013.01); *F05D 2230/50* (2013.01); *F05D 2240/12* (2013.01); *F05D 2240/30* (2013.01); *F05D 2260/20* (2013.01); *F05D 2260/98* (2013.01)

(58) Field of Classification Search
CPC ....... B24B 39/023; B33Y 40/00; B33Y 80/00; F01D 25/18; F01D 2220/32; F01D 2230/50; F01D 2240/12; F01D 2240/30; F01D 2260/20; F01D 2260/98; B21D 31/04; B21D 41/02; B21D 41/026; B21D 39/10; B21D 39/14; B21D 39/18
See application file for complete search history.

(56) References Cited

U.S. PATENT DOCUMENTS 2,497,021 A    2/1950   Sterns
3,156,042 A *  11/1964  Reed ...................... B21D 39/04
                                                      228/126
(Continued)

OTHER PUBLICATIONS

Science Direct Abstract."Bore finishing—the ballizing process". By Nee and Venkatesh. Mar. 1982. https://www.sciencedirect.com/science/article/abs/pii/0378380482900109.*

*Primary Examiner* — David P Bryant
*Assistant Examiner* — Nirvana Deonauth
(74) *Attorney, Agent, or Firm* — Snell & Wilmer L.L.P.

(57) ABSTRACT

A method for smoothing surface roughness within an internal passageway is disclosed. In various embodiments, the method comprises developing a first sphere progression through a length of the internal passageway, each sphere within the first sphere progression having a first sphere diameter greater than or equal to a diameter of the internal passageway; and developing a second sphere progression through the length of the internal passageway, each sphere within the second sphere progression having a second sphere diameter greater than the first sphere diameter, whereby the inner surface of the internal passageway is smoothed, first by the first sphere progression and then by the second sphere progression.

9 Claims, 6 Drawing Sheets

(51) Int. Cl.
*B33Y 80/00* (2015.01)
*F01D 25/12* (2006.01)
*F01D 25/18* (2006.01)

(56) References Cited

U.S. PATENT DOCUMENTS

| | | | |
|---|---|---|---|
| 3,335,485 A * | 8/1967 | Russo | B21D 9/125 |
| | | | 29/890.149 |
| 3,665,601 A * | 5/1972 | Dunbabin | H01R 24/545 |
| | | | 29/882 |
| 3,852,871 A * | 12/1974 | Read, Jr. | B23P 11/02 |
| | | | 29/445 |
| 4,417,421 A | 11/1983 | Akagi et al. | |
| 4,692,097 A * | 9/1987 | Bibollet | B63H 3/12 |
| | | | 416/207 |
| 5,341,602 A | 8/1994 | Foley | |
| 7,044,842 B2 | 5/2006 | Rhoades | |
| 7,390,241 B2 | 6/2008 | Kajita | |
| 9,550,267 B2 | 1/2017 | Beckman et al. | |
| 2016/0082565 A1 | 3/2016 | Kenda et al. | |
| 2016/0228929 A1 | 8/2016 | Williamson et al. | |
| 2017/0197284 A1 | 7/2017 | Twelves, Jr. et al. | |
| 2017/0361418 A1 | 12/2017 | Twelves et al. | |

\* cited by examiner

SMOOTHING ROUND INTERNAL PASSAGES OF ADDITIVELY MANUFACTURED PARTS USING METALLIC SPHERES

FIELD

The present disclosure relates generally to methods of finishing internal portions of additively manufactured components and, more particularly, to methods in which a series of spheres is used to smooth walls of circular passageways extending within additively manufactured components.

BACKGROUND

Fabrication processes such as additive manufacturing enable fabrication of article geometries that are difficult or otherwise impossible to make by other fabrication techniques. For example, components in gas turbine engines may include internal passages for conveying coolants or lubricants. Additive manufacturing and other advances permit such passages to be formed with complex geometries in thin wall structures and with high-aspect ratios (e.g., the ratio of passage length to passage diametric size). However, due to the additive manufacturing process, and even in other fabrication processes, the internal surfaces of these passages can be rough following the fabrication process. If left in the final component, this surface roughness has the potential to interfere with fluid flow through the passageways.

A technique for smoothing surface roughness or polishing internal surfaces of conduits or passages in metal components is referred to as ballizing, where a machine having a push rod is used to push a sphere of known diameter through a machined and generally linear bore hole. A force that the sphere exerts on the workpiece as it traverses the length of the bore hole shapes and polishes the inner surface of the conduit. Conventional ballizing techniques typically utilize straight bore holes and thus have difficulty smoothing surfaces of conduits or passages having curved portions.

SUMMARY

A method for smoothing surface roughness within an internal passageway is disclosed. In various embodiments, the method comprises the steps of determining a diameter of the internal passageway; urging a first sphere into the internal passageway and to a first distance along a length of the internal passageway, the first sphere having a first sphere diameter greater than or equal to the diameter of the internal passageway; and urging a second sphere into the internal passageway, the second sphere having a second sphere diameter greater than or equal to the diameter of the internal passageway, the second sphere urging the first sphere to a second distance along the length of the internal passageway, whereby an inner surface of the internal passageway is smoothed by the first sphere along the second distance of the length and the inner surface of the internal passageway is further smoothed by the second sphere along the first distance of the length.

In various embodiments, the method further comprises comprising urging a third sphere into the internal passageway, the third sphere urging the second sphere to the second distance along the length of the internal passageway and the first sphere to a third distance along the internal passageway. In various embodiments, the method further comprises urging subsequent spheres into the internal passageway until the first sphere exits the internal passageway. In various embodiments, the second distance is measured from an inlet of the internal passageway. In various embodiments, the second distance is measured from a starting point within the internal passageway.

In various embodiments, the diameter of the internal passageway is an average diameter. In various embodiments, the first sphere diameter is equal to the diameter of the internal passageway. In various embodiments, the second sphere diameter is equal to the first sphere diameter. In various embodiments, the second sphere diameter is greater than the first sphere diameter. In various embodiments, the internal passageway is substantially straight along the length. In various embodiments, the internal passageway has a curved portion along the length.

In various embodiments, a set of spheres remaining in the internal passageway is urged to exit the internal passageway using at least one of a flexible rod and a source of pressurized air. In various embodiments, a set of spheres remaining in the passageway is urged to exit the internal passageway using one or more subsequent spheres having a subsequent sphere diameter less than or equal to the first sphere diameter.

A method for smoothing surface roughness within an internal passageway is disclosed. In various embodiments, the method comprises the steps of determining a diameter of the internal passageway; urging a first sphere into the internal passageway and to a first distance along a length of the internal passageway, the first sphere having a first sphere diameter greater than or equal to the diameter of the internal passageway; and urging a second sphere into the internal passageway, wherein the second sphere has a second sphere diameter greater than the first sphere diameter, the second sphere urging the first sphere to a second distance along the length of the internal passageway, whereby an inner surface of the internal passageway is smoothed by the first sphere along the second distance of the length and the inner surface of the internal passageway is further smoothed along a first portion of the length.

In various embodiments, the method further comprises urging a third sphere into the internal passageway, the third sphere urging the second sphere to the second distance along the length of the internal passageway and the first sphere to a third distance along the internal passageway, the third sphere having a third sphere diameter greater than the second sphere diameter. In various embodiments, the method further comprises urging subsequent spheres into the internal passageway until the first sphere exits the internal passageway. In various embodiments, a set of spheres remaining in the internal passageway is urged to exit the internal passageway using at least one of a rod and a source of pressurized air.

A method for smoothing surface roughness within an internal passageway is disclosed. In various embodiments, the method comprises the steps of determining a diameter of the internal passageway; developing a first sphere progression through a length of the internal passageway, each member within the first sphere progression having a first diameter greater than or equal to the diameter of the internal passageway, an inner surface of the internal passageway being smoothed by the first sphere progression along the length; and developing a second sphere progression through the length of the internal passageway, each member within the second sphere progression having a second diameter greater than the first diameter, the inner surface of the internal passageway being further smoothed by the second sphere progression along the length.

In various embodiments, the method further comprises developing a final sphere progression, wherein each member within the final sphere progression has a final diameter less than a largest sphere diameter associated with any previous sphere progression developed within the internal passageway. In various embodiments, the internal passageway includes a curved portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
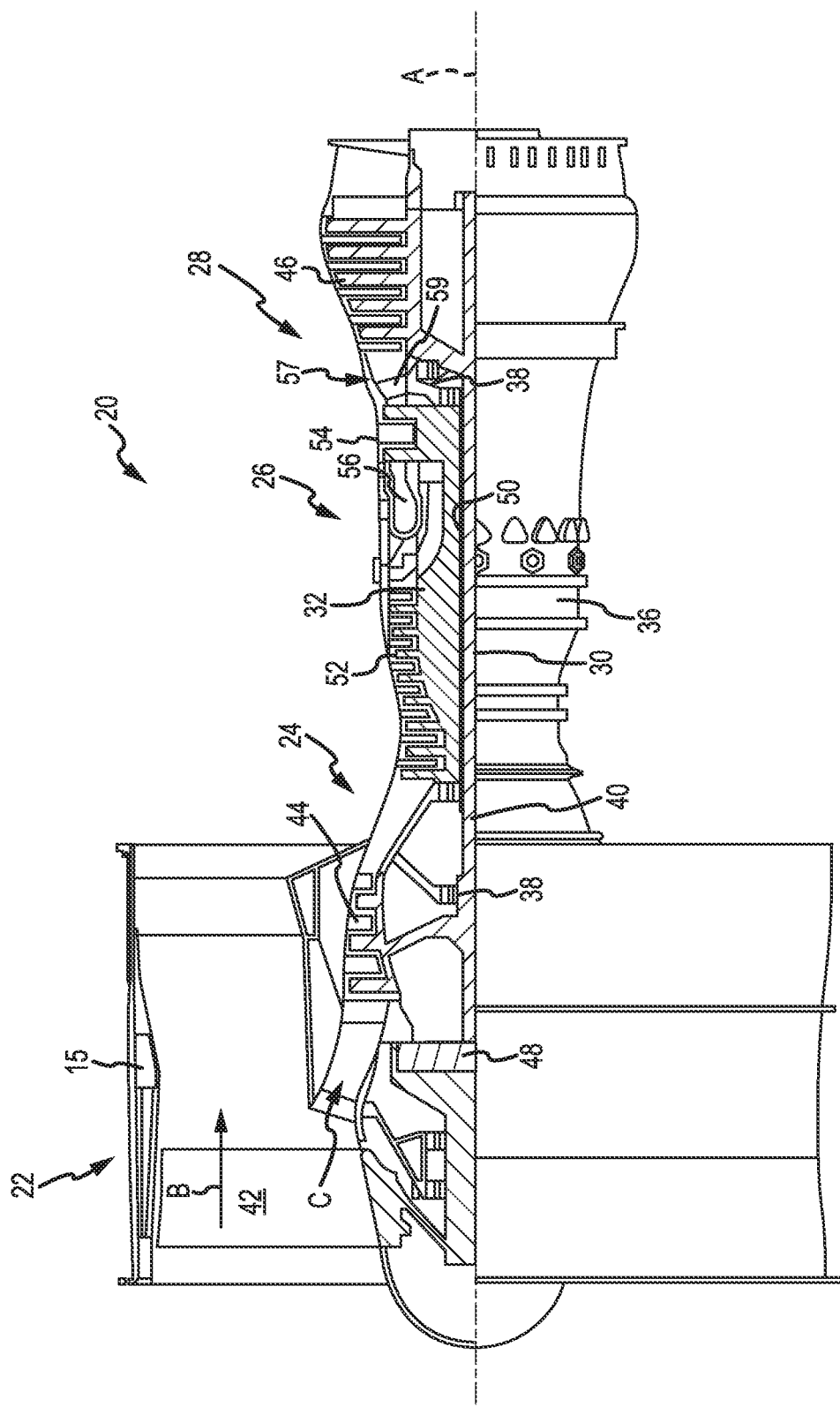
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Various components of the gas turbine engine 20 include conduits or passageways extending through the component or a portion thereof. For example, components in the gas turbine engine 20 may include internal passageways for conveying a coolant. Such components include, for example, the blades and the stators that comprise the compressor and turbine sections described above. Such components may also comprise passageways for conveying bleed air from the compressor to other areas of the gas turbine engine 20 benefitting from a source of high-pressure cooling fluid. Other components comprising conduits or passageways include the lubrication system, where lubricants are delivered from a pump to bearings and the like. Many of these various components are constructed using additive manufacturing techniques and include conduits or passageways having curved portions with rough internal surfaces following their manufacture.

Figure 2:
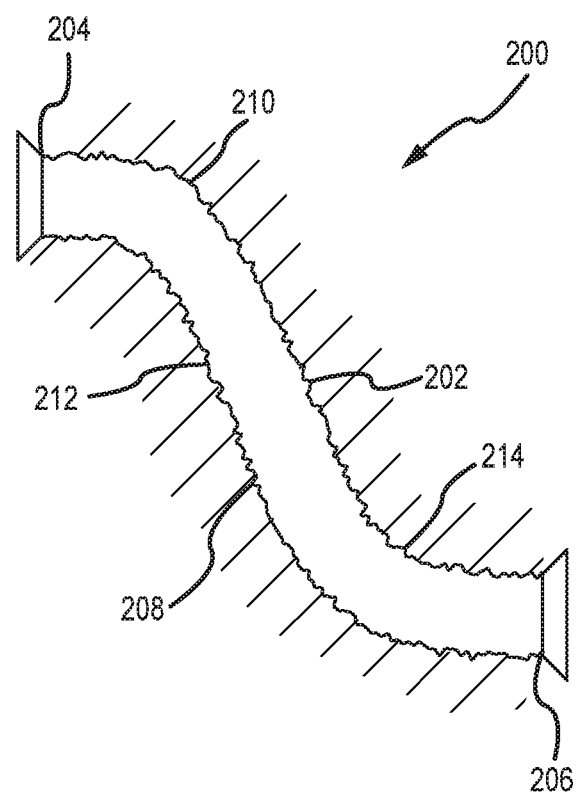
FIG. 2 is a cross sectional schematic view of a passageway extending through the interior of an additively manufactured part, in accordance with various embodiments.

Referring now to FIG. 2, a component 200, fabricated through additive manufacture, is illustrated. The component 200 includes a passageway 202 extending from a first end 204 to a second end 206. The passageway 202 is defined by an inner surface 208 that, in various embodiments, is generally circular in cross section from the first end 204 to the second end 206. As illustrated, the inner surface 208 of the passageway 202 may be characterized by an undesirable degree of surface roughness following initial fabrication through additive manufacture. In various embodiments, the passageway 202 is curved at one or more portions along a length defined by an arc-length distance from the first end 204 to the second end 206. As illustrated, for example, the passageway 202, in various embodiments, includes a first curved portion 210 downstream of the first end 204, followed by a substantially straight portion 212, and then followed by a second curved portion 214 upstream of the second end 206. In various embodiments, the first curved portion 210 may be characterized such that a line of sight does not exist between the location of the passageway 202 where the first curved portion 210 commences and the location of the passageway 202 where the first curved portion 210 terminates, or where the substantially straight portion 212 commences. A similar characterization applies to the second curved portion 214 or any additional curved portions that may be present in a passageway. The disclosure that follows provides, among other things, a technique and method to reduce the surface roughness of the passageway 202 within the component 200, or other components having a various numbers of curved or straight passageways.

Figure 3A:
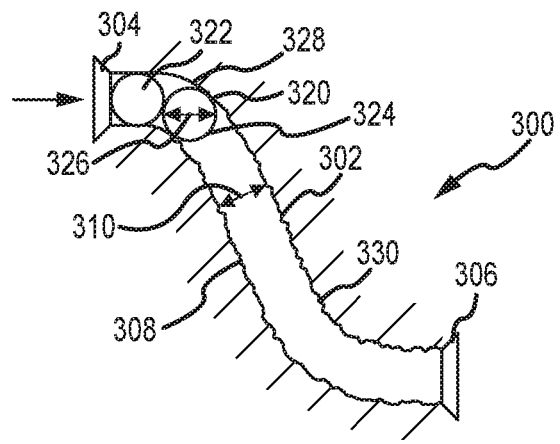
FIGS. 3A, 3B and 3C are cross sectional schematic views of an internal passageway undergoing a ballizing process, in accordance with various embodiments.
Figure 3B:
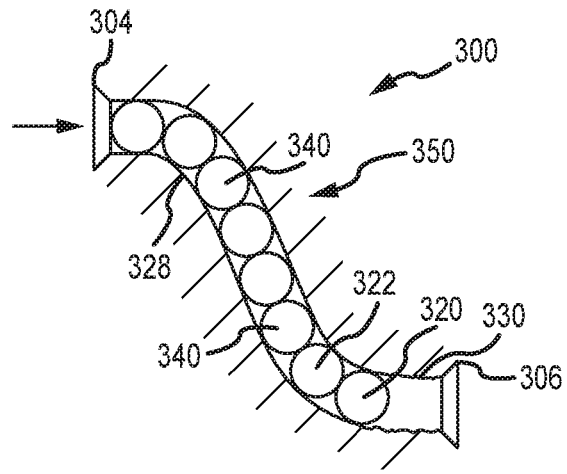
Figure 3C:
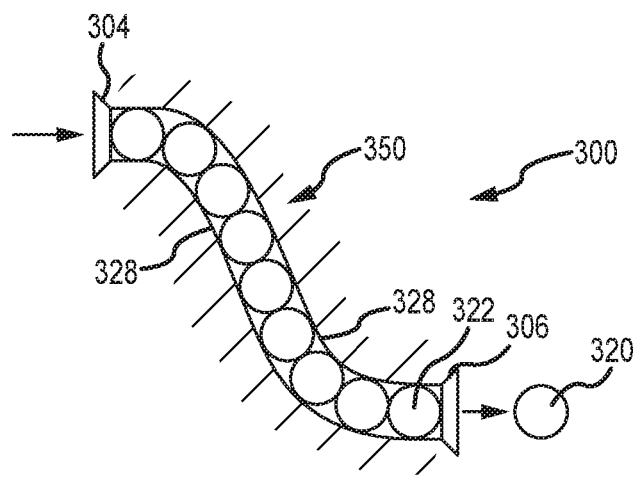

Referring now to FIGS. 3A, 3B and 3C, a series of steps is illustrated whereby a component 300 undergoes a finishing process following initial fabrication through, for example, additive manufacture. Similar to the component 200 described above with reference to FIG. 2, the component 300 includes a passageway 302 having an undesirable degree of surface roughness. The passageway 302 extends from a first end 304 to a second end 306 and is defined by an inner surface 308 that, in various embodiments, is generally circular in cross section from the first end 304 to the second end 306. In various embodiments, the inner surface 308 may be defined by a diameter, D, that is the intended diameter of the inner surface 308 or of the passageway 302. In various embodiments, the inner surface 308 may be defined by an average diameter 310, $D_{avg}$, that takes into account the surface roughness along a length of the passageway 302 or at least a portion thereof. For example, in various embodiments, the average diameter is the mean between a nominal or intended diameter of the inner surface 308 or the passageway 302 and a minimum diameter—e.g., a diameter that takes into account the peaks of the surface roughness extending inward from the inner surface 308. In various embodiments, the average diameter is the mean between a maximum diameter—e.g., a diameter that takes into account the troughs of the surface roughness extending outward from the inner surface 308—and a minimum diameter—e.g., a diameter that takes into account the peaks of the surface roughness extending inward from the inner surface 308.

Referring to FIG. 3A, a first sphere 320 is inserted through the first end 304 of the passageway 302, followed by a second sphere 322. The second sphere 322 serves to force the first sphere 320 through the passageway 302 and to further smooth the passageway 302 behind the first sphere 320. In various embodiments, the first sphere 320 defines an outer surface 324 that is generally spherical in shape and has a first sphere diameter 326. In various embodiments, the first sphere diameter 326 is equal to the average diameter 310 of the passageway 302. As the first sphere 320 traverses the passageway 302, the outer surface 324 of the first sphere 320 flattens and generally smooths the surface roughness present on the inner surface 308 of the passageway 302. As the first sphere 320 traverses the passageway 302, the inner surface 308 includes a smooth surface 328 that becomes progressively longer along the length of the passageway 302 as the first sphere 320 traverses the passageway 302. Contrarily, as the first sphere 320 traverses the passageway 302, the inner surface 308 includes a rough surface 330—i.e., the unsmoothed surface ahead of the first sphere 320—that becomes progressively shorter as the first sphere 320 traverses the passageway 302.

Referring now to FIGS. 3B and 3C, the first sphere 320 is illustrated having traversed nearly the entire length of the passageway 302, followed by the second sphere 322. The first sphere 320 and the second sphere 322 are urged along the length of the passageway 302, from the first end 304 to the second end 306, by the introduction of subsequent spheres 340 at the first end 304 of the passageway 302. Each of the subsequent spheres 340 urges the sphere ahead of it and is itself urged by the sphere behind it, such that a progression of spheres 350 extends through the passageway 302. As the progression of spheres 350 extends through the passageway 302, the outer surface of each sphere—e.g., starting with the outer surface 324 of the first sphere 320—progressively smooths the rough surface 330 of the inner surface 308. As illustrated in FIG. 3C, the first sphere 320 will eventually exit the passageway 302 at the second end 306, followed by each of the subsequent spheres 340. Subsequent spheres 340 are continually added and urged through the passageway 302 until a desired smoothness to the inner surface 308 of the passageway 302 is achieved. Once the desired smoothness is achieved, any spheres remaining in the passageway 302 may be urged toward and through the second end 306 using a flexible rod or high pressure air introduced at the first end 304. In various embodiments, the first sphere begins smoothing starting not from the first end 304 or inlet to the passageway 302, but from a starting point within the passageway, such occurring, for example, with passageways having a first portion with a larger diameter than the diameter of a second portion with a smaller diameter commencing from the starting point. In various embodiments, each of the spheres comprises a metallic composition having a hardness—e.g., a hardness measured by a Rockwell or Brinell scale—that is harder than the material surrounding the passageway.

Figure 4A:
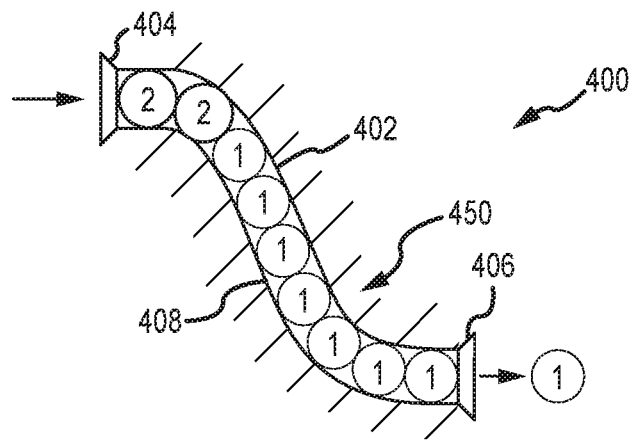
FIGS. 4A, 4B and 4C are cross sectional schematic views of an internal passageway undergoing a ballizing process, in accordance with various embodiments.
Figure 4B:
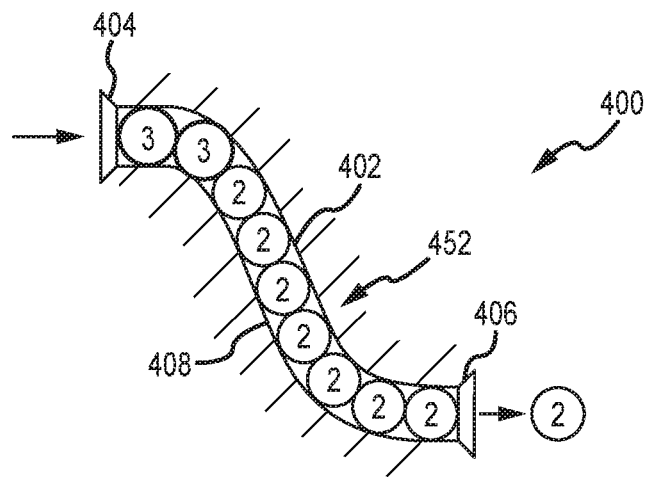
Figure 4C:
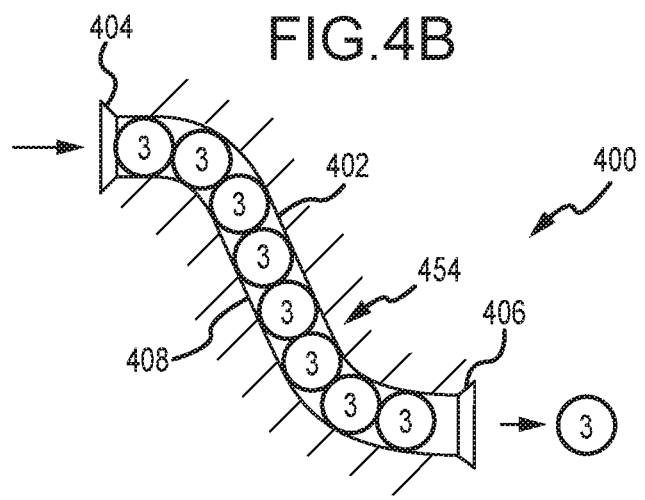

Referring now to FIGS. 4A, 4B and 4C, a series of steps is illustrated whereby a component 400 undergoes a finishing process following initial fabrication through, for example, additive manufacture. Similar to the component 200 described above with reference to FIG. 2, the component 400 includes a passageway 402 having an undesirable degree of surface roughness. The passageway 402 extends from a first end 404 to a second end 406 and is defined by an inner surface 408 that, in various embodiments, is generally circular in cross section from the first end 404 to the second end 406. In various embodiments, the inner surface 408 may be defined by an average diameter, $D_{avg}$, that takes into account the surface roughness along a length of the passageway 402 or at least a portion thereof.

Referring to FIG. 4A, a first progression of spheres 450 is illustrated extending through the passageway 402. In various embodiments, the first progression of spheres 450 starts with the progression of spheres 350 discussed above with reference to FIG. 3C. More specifically, the undesired roughness in the passageway 402 may undergo a first smoothing step by urging a first plurality of spheres through the passageway 402 until a desired smoothing is achieved and the first smoothing step is complete. As indicated in FIG. 4A, each one of the first plurality of spheres is identified with the numeral "1." Each one of the first plurality of spheres is also defined by a first sphere diameter, $D_1$. Similar to the discussion above, in various embodiments, the first sphere diameter $D_1$ is equal to the average diameter $D_{avg}$ of the passageway 402 prior to smoothing.

Following completion of the first smoothing step, a second plurality of spheres is urged through the passageway 402 until a second progression of spheres 452 is developed, extending from the first end 404 to the second end 406 of the passageway 402 or for a portion of the length thereof. As indicated in FIGS. 4A and 4B, each one of the second plurality of spheres is identified with the numeral "2." Each one of the second plurality of spheres is also defined by a second sphere diameter, $D_2$. In various embodiments, the second sphere diameter $D_2$ is larger than the first sphere diameter $D_1$ by a first diameter difference, $\Delta D_1 = D_2 - D_1$. The larger second sphere diameter $D_2$ and, more particularly, the first diameter difference $\Delta D_1$ is selected to further smooth the inner surface 408 of the passageway 402 until a second smoothing step is complete.

Referring now to FIG. 4C, following completion of the second smoothing step, a third plurality of spheres is urged through the passageway 402 until a third progression of spheres 454 is developed, extending from the first end 404 to the second end 406 of the passageway 402 or for a portion of the length thereof. As indicated in FIG. 4C, each one of the third plurality of spheres is identified with the numeral "3." Each one of the third plurality of spheres is also defined by a third sphere diameter, $D_3$. In various embodiments, the third sphere diameter $D_3$ is larger than the second sphere diameter $D_2$ by a second diameter difference, $\Delta D_2 = D_3 - D_2$. The larger third sphere diameter $D_3$ and, more particularly, the second diameter difference $\Delta D_2$ is selected to yet further smooth the inner surface 408 of the passageway 402 until a third smoothing step is complete. In various embodiments, progressively larger spheres may follow the third plurality or progression of spheres to affect a desired smoothness. In various embodiments, $\Delta D_i$ (i=1, N) has a value equal to one (1) to ten (10) microns. In various embodiments, each of the spheres comprises a metallic composition having a hardness—e.g., a hardness measured by a Rockwell or Brinell scale—that is harder than the material surrounding the passageway.

Figure 5:
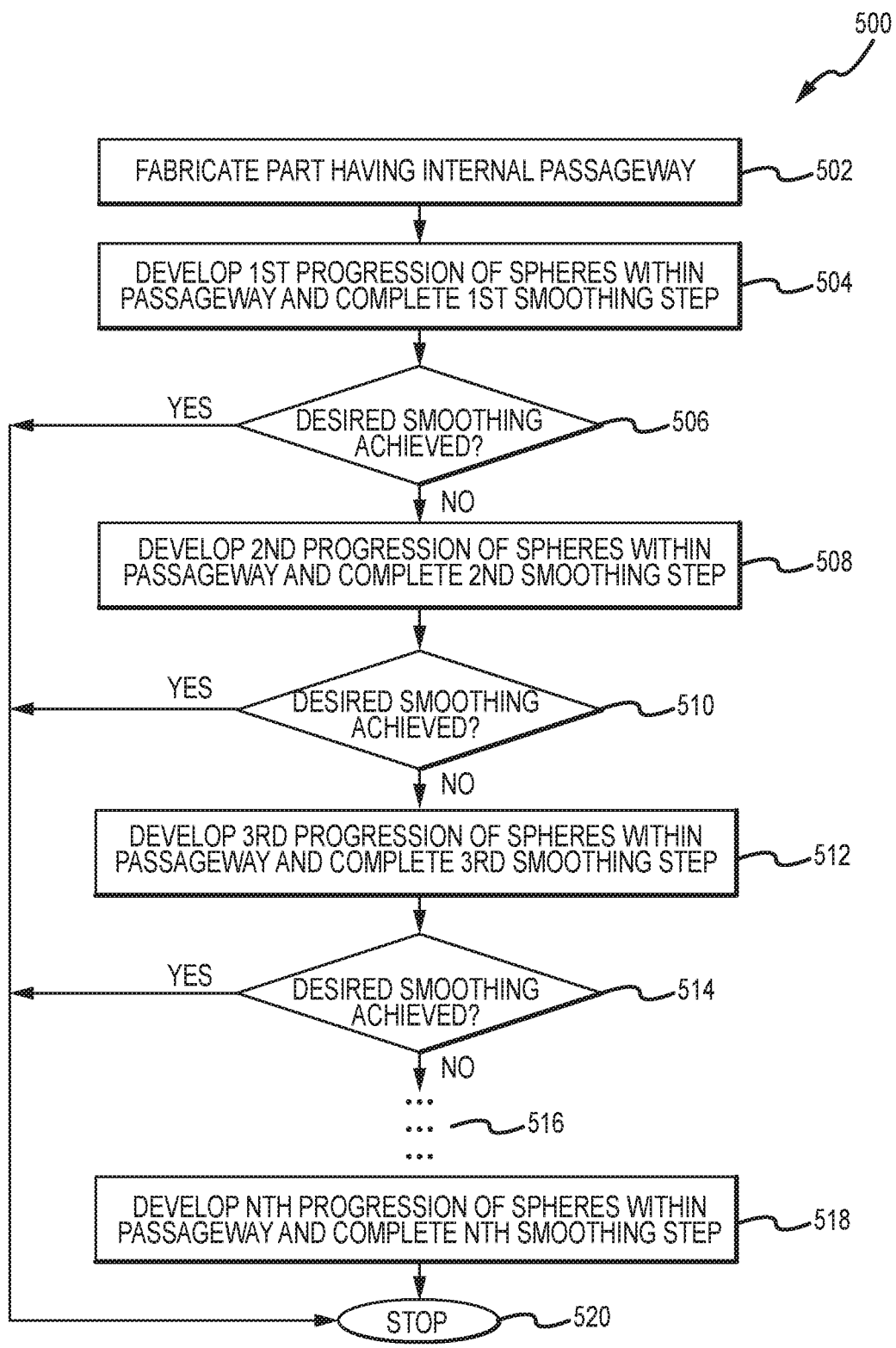
FIG. 5 is a cross sectional schematic view of an internal passageway undergoing a ballizing process, in accordance with various embodiments.

Referring now to FIG. 5, a process 500 is illustrated whereby a component having an internal passageway is fabricated and followed by a series of steps for smoothing an inner surface of the internal passageway. According to the process, a component having an internal passageway is fabricated at a first step 502. In various embodiments, the component is fabricated using an additive manufacturing process. Once the component is fabricated, a first smoothing step 504 contemplates developing a first progression of spheres having a first diameter, $D_1$, within the passageway. In various embodiments, the first smoothing step 504 is completed and a determination is made whether a desired smoothness within the passageway is achieved 506. If the desired smoothness is achieved, the first progression of spheres is removed from the passageway and the process 500 is terminated 520.

If the desired smoothing is not achieved, a second smoothing step 508 contemplates developing a second progression of spheres having a second diameter, $D_2$, within the passageway. As described above with reference to FIGS. 4A, 4B and 4C, the second diameter $D_2$ is larger than the first diameter $D_1$ by a first diameter difference, $\Delta D_1 = D_2 - D_1$. In various embodiments, the second smoothing step 508 is completed and a determination is made whether a desired smoothness within the passageway is achieved 510. If the desired smoothness is achieved, the second progression of spheres is removed from the passageway and the process 500 is terminated 520.

If the desired smoothing is not achieved, a third smoothing step 512 contemplates developing a third progression of spheres having a third diameter, $D_3$, within the passageway. As described above with reference to FIGS. 4A, 4B and 4C, the third diameter $D_3$ is larger than the second diameter $D_2$ by a second diameter difference, $\Delta D_2 = D_3 - D_2$. In various embodiments, the third smoothing step 512 is completed and a determination is made whether a desired smoothness within the passageway is achieved 514. If the desired smoothness is achieved, the third progression of spheres is removed from the passageway and the process 500 is terminated 520. If the desired smoothing is not achieved, subsequent smoothing steps 516 are performed as may be required, using spheres having progressively larger diameters, $D_i$, (i=4, N), until the desired smoothness is achieved, at which point the spheres having an Nth diameter, $D_N$, are removed.

Figure 6:
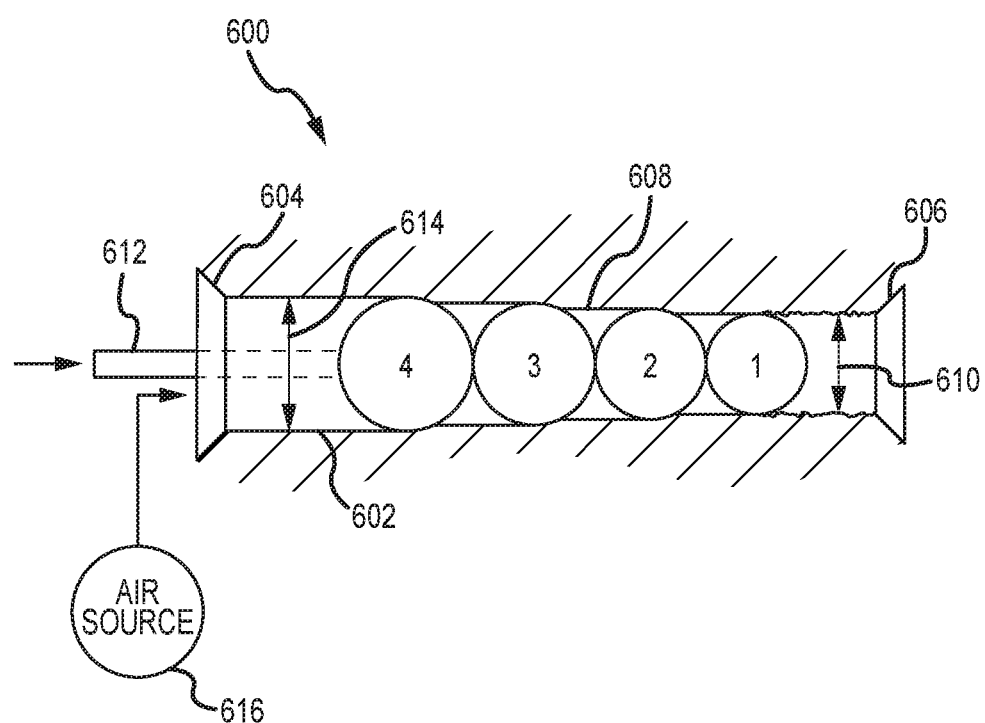
FIG. 6 is a cross sectional schematic view of an internal passageway undergoing a ballizing process, in accordance with various embodiments.

Referring now to FIG. 6, a series of steps is illustrated whereby a component 600 undergoes a finishing process following initial fabrication through, for example, additive manufacture. In various embodiments, the component 600 includes a passageway 602 that may be similar to the component 200 described above with reference to FIG. 2, including having an undesirable degree of surface roughness. In various embodiments, the passageway 602 is straight or substantially straight, such that the passageway includes no curves along its length. The passageway 602 extends from a first end 604 to a second end 606 and is defined by an inner surface 608 that, in various embodiments, is generally circular in cross section from the first end 604 to the second end 606. In various embodiments, the inner surface 608 may be defined by an average diameter 610, prior to smoothing, that takes into account the surface roughness along a length of the passageway 602 or at least a portion thereof.

In various embodiments, a first ball, identified with the numeral "1," is inserted into the passageway 602 at the first end 604, followed sequentially by a second ball, identified with the numeral "2," a third ball, identified with the numeral "3," and a fourth ball, identified with the numeral "4." Each sphere has a progressively larger diameter, such that $D_4 > D_3 > D_2 > D_1$. Subsequent spheres, having progressively larger diameters, $D_i$, (i=5, N) may follow, as may be required. In various embodiments, the progression of spheres having progressively larger diameters $D_i$ (i=1,N) is used to smooth the inner surface 608 until a desired smoothness is achieved. In various embodiments, where the material comprising the component 600 is sufficiently soft, the progression of spheres having progressively larger diameters $D_i$ (i=1,N) may also be used to enlarge the diameter of the passageway 602 from the average diameter 610 following initial fabrication of the component 600 to a final diameter 614. In various embodiments, following the final sphere being inserted—e.g., Sphere 4 having diameter $D_4$—a rod 612 may be employed to urge the final sphere and any preceding spheres remaining within the passageway 602 out the second end 606 of the passageway 602. In various embodiments, progressively larger spheres may follow to affect a desired smoothness or enlargement. In various embodiments, the difference between sphere diameters has a value equal to one (1) to ten (10) microns. In various embodiments, each of the spheres comprises a metallic composition having a hardness—e.g., a hardness measured by a Rockwell or Brinell scale—that is harder than the material surrounding the passageway.

In various embodiments, a source 616 of high pressure air may also be used to urge the spheres remaining in the passageway 602 out the second end 606. In various embodiments, the rod 612, which may be a flexible rod capable of negotiating curved passageways, or the source 616 of high pressure air, may be used with any of the other embodiments described above to remove one or more spheres remaining in a passageway—e.g., the passageway 302 referred to above with reference to FIGS. 3A, 3B and 3C or the passageway 402 referred to above with reference to FIGS. 4A, 4B and 4C—following smoothing or diameter increasing processes. In various embodiments, spheres having smaller diameters than the spheres remaining in a straight or curved passageway may be used to urge any spheres remaining in the passageway out an exit portion of the passageway.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for smoothing surface roughness within an internal passageway, comprising:

urging a first sphere into the internal passageway and to a first distance along a first curved portion of a length of the internal passageway, wherein the first sphere has a first sphere diameter greater than or equal to a diameter of the internal passageway;

urging a second sphere into the internal passageway, the second sphere having a second sphere diameter greater than or equal to the diameter of the internal passageway, the second sphere urging the first sphere to a second distance along the first curved portion of the length of the internal passageway;

urging the first sphere along a substantially straight portion of the internal passageway downstream of the first curved portion via the second sphere; and urging the first sphere along a second curved portion of the internal passageway downstream of the substantially straight portion via the second sphere, wherein an inner surface of the internal passageway is smoothed by the first sphere along the second distance of the length and wherein the inner surface of the internal passageway is further smoothed by the second sphere along the first distance of the length and wherein the first curved portion, the substantially straight portion and the second curved portion extend along an arc-length distance of the length of the internal passageway.

2. The method of claim 1, further comprising urging a third sphere into the internal passageway, the third sphere urging the second sphere to the second distance along the length of the internal passageway and the first sphere to a third distance along the internal passageway.

3. The method of claim 2, further comprising urging subsequent spheres into the internal passageway until the first sphere exits the internal passageway.

4. The method of claim 1, wherein the second distance is measured from an inlet of the internal passageway.

5. The method of claim 1, wherein the second distance is measured from a starting point within the internal passageway.

6. The method of claim 1, wherein the diameter of the internal passageway is an average diameter.

7. The method of claim 1, wherein the first sphere diameter is equal to the diameter of the internal passageway.

8. The method of claim 1, wherein the second sphere diameter is equal to the first sphere diameter.

9. The method of claim 1, wherein the second sphere diameter is greater than the first sphere diameter.

\* \* \* \* \*